APPARATUS FOR DECODING AN ENCODED LIGHT IMAGE
Filed March 3, 1961 3 Sheets-Sheet 1
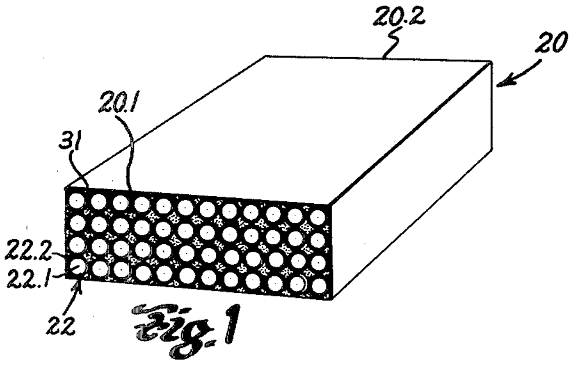
Fig. 1
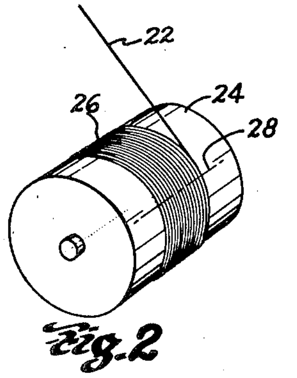
Fig. 2
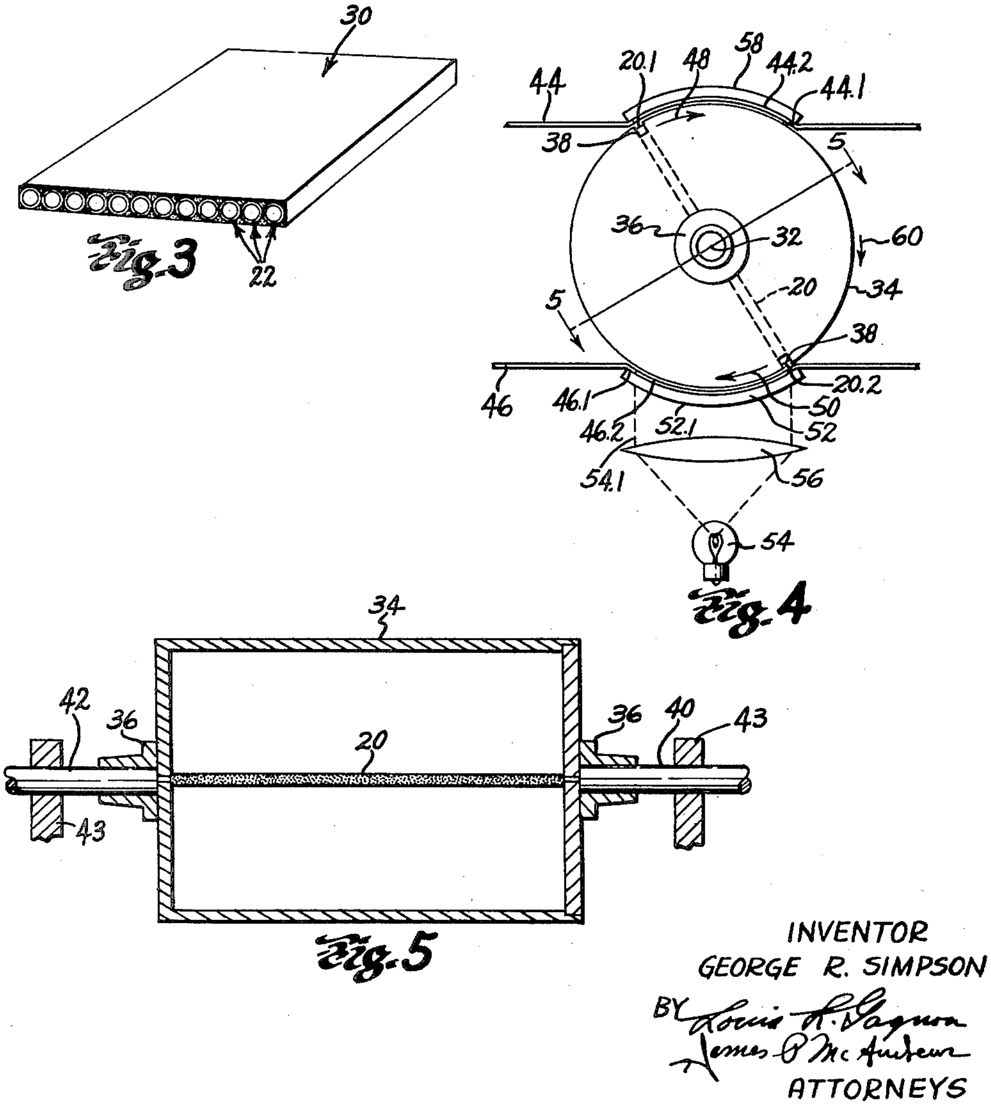
Fig. 3, Fig. 4
Fig. 5
INVENTOR
GEORGE R. SIMPSON
BY Louis R. Gagnon
James P. McAndrews
ATTORNEYS INVENTOR
GEORGE R. SIMPSON
BY Louis L. Gagnon
James P. McAndrew
ATTORNEYS INVENTOR
GEORGE R. SIMPSON
BY Louis L. Gagnon
James B. McFadden
ATTORNEYS

United States Patent Office 3,125,812
Patented Mar. 24, 1964

3,125,812

APPARATUS FOR DECODING AN ENCODED LIGHT IMAGE

George R. Simpson, South Woodstock, Conn., assignor to American Optical Company, Southbridge, Mass., a voluntary association of Massachusetts Filed Mar. 3, 1961, Ser. No. 93,167
4 Claims. (Cl. 35—3)

The field of this invention is that of image encoding and decoding, and the invention relates, more particularly, to novel and improved apparatus for encoding and decoding optical images.

Image encoding and decoding is useful in banking practice, for example, where a bank depositor's signature can be encoded in a scrambled, unrecognizable form upon the depositor's individual deposit passbook for use in identifying the depositor when the wishes to make a withdrawal from his account. When the depositor makes a withdrawal, a bank teller can verify the depositor's signature upon the usual withdrawal slip by decoding the scrambled signature appearing upon the depositor's passbook and by comparing the decoded signature with that appearing upon the withdrawal slip. Issuance of the passbook with an encoded form of the depositor's signature thereon does not entail any significant risk since a putative forger, not having access to decoding apparatus, could not readily use the encoded signature as an aid in forging the depositor's signature even if he should come into possession of the passbook. This signature verification system is considerably less involved than the procedures presently relied upon for this purpose and permits a substantial reduction in the time required for handling many routine banking transactions. However, for such a signature verification system to be practical, particularly for larger banks which may have a large number of branch offices, at least one image encoding device should be available for use in providing depositor passbooks with encoded signatures, and each teller in each of the main or branch offices of the bank should be provided with a device adapted to decode the signature appearing on any passbook presented to him. Thus, practical application of the system requires use of a large number of image-encoding and decoding devices which are adapted for interchangeable use.

It is an object of this invention to provide novel and improved apparatus for encoding and decoding an image; to provide apparatus by means of which an image, once encoded, can be conveniently and accurately decoded at any desired number of stations; to provide apparatus for encoding and decoding an image wherein segments of an image are rearranged in a predetermined different pattern for encoding the image and are thereafter reoriented for decoding the encoded image; and to provide such apparatus for encoding and decoding optical images which are especially adapted for encoding and decoding optical images of handwritten signatures.

It is a further object of this invention to provide apparatus for encoding and decoding an image wherein segments of an image established at one location are transmitted in sequence to another location and are recorded in a predetermined different pattern at said other location for encoding the image and wherein, in thereafter decoding the recorded image, said image segments are transmitted in sequence from said recorded image at one location and are reproduced in reoriented relation at another location.

It is another of this invention to provide apparatus for encoding and decoding an optical image wherein segments of an optical image established at one location are transmitted in sequence to another location and are there recorded upon light-sensitive film in a predetermined different pattern for encoding the image, and wherein, in thereafter decoding the optical image, said image segments are transmitted from said recorded image at one location and are displayed in reoriented relation at another location in such rapid sequence that said image segments appear to be displayed substantially simultaneously as a result of the natural visual retention of the eye, whereby the cooperation of said image segments to form an overall decoded image can be easily recognized.

An additional object of this invention is to provide novel and improved apparatus for encoding and decoding an optical image wherein a fiber optical image-transfer device is adapted to scan an optical image at one location for reproducing segments of the image in sequence at another location so that said image segments can be there recorded upon light-sensitive film in a predetermined different pattern for encoding the image, said fiber-optical device also being adapted to scan said recorded image at one location for displaying said image segments in reoriented relation at another location in such rapid sequence that said image segments appear to be displayed substantially simultaneously as a result of the natural visual retention of the eye, whereby the cooperation of said segments to form an overall decoded image can be easily recognized.

Other objects, advantages and details of the apparatus of this invention appear in the following detailed description of preferred embodiments of the invention, the description referring to the drawings wherein:

FIG. 1 is a perspective view of a fiber-optical image-transfer device utilized in the apparatus of this invention;

FIG. 2 is a perspective view illustrating a step in the manufacture of the device of FIG. 1;

FIG. 3 is a perspective view illustrating a subsequent step in the manufacture of the device of FIG. 1;

FIG. 4 is a side elevation view illustrating one embodiment of the apparatus of this invention used for encording an optical image;

FIG. 5 is a section view along line 5—5 of FIG. 4;

Figure 6:
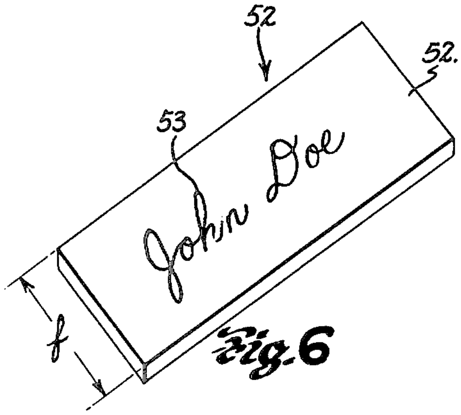
FIG. 6 is a perspective view of a signature card showing an optical image to be encoded.

Referring to the drawings, 20 in FIG. 1 illustrates a fiber-optical image-transfer device of conventional design which can be incorporated in apparatus provided by this invention for encoding and decoding optical images. The image-transfer device embodies a plurality of light-conducting fibers 22 which are preferably assembled in side-by-side parallel relation with corresponding ends of the fibers arranged in substantially identical geometrical patterns at opposite ends 20.1 and 20.2. Preferably each light-conducting fiber 22 embodies a fiber core 22.1 of a light-transmitting material such as flint glass having a relatively high index of refraction and a fiber cladding 22.2 of a light-transmitting material such as crown glass having a relatively low index of refraction, whereby each fiber is adapted to transmit light from end to end thereof through the fiber core by total internal reflection of the light from the interface of the fiber core and cladding in accordance with well-known principles. As will be understood, the fibers 22 embodied in the device 20 are adapted to receive light from respective portions of an optical image or segment of an image directed upon one end 20.1 of the device for transmitting said light to the opposite end 20.2 of the device and for reproducing said image or image segment in mosaic form at said opposite end in conventional manner. It should be understood that materials other than the noted flint and crown glasses can be used to provide fibers which are adapted to transmit light or other electromagnetic energy and, if desired, the fibers can be adapted to transmit other forms of energy within the scope of this invention. For example, the fiber cores could embody a metallic, electrically-conductive material and the fiber claddings could embody an electrically-insulating material such as glass, thereby to adapt the fibers for transmitting electrical energy.

The device 20 can be formed in many well known ways but, in order to provide a device in which the fibers are arranged in substantially identical or otherwise predetermined geometrical patterns at opposite ends, a convenient and preferred method for manufacturing the device can be performed as follows. An individual fiber 22 can be wound upon a cylindrical mandrel 24 as shown in FIG. 2 for forming a helix 26 which is then preferably coated with a cellulose acetate or polyvinyl alcohol cement or the like for securing adjacent convolutions of the helix together. The helix can then be cut parallel to the mandrel axis as at 28 to form a fiber ribbon 30 as shown in FIG. 3, the ribbon 30 embodying a plurality of lengths of the fiber 22 in side-by-side parallel relation. A single fiber ribbon 30 can be said to form an image-transfer device but preferably a number of the ribbons are stacked in superimposed relation and are secured together with a suitable cement 31 to form a device 20 as illustrated in FIG. 1. The fiber ribbons may also be secured together in stacked relation by fusing of the fiber claddings if desired.

In one embodiment of this invention, the image-transfer device 20 has opposite ends 20.1 and 20.2 which are relatively wide and thin as shown in FIG. 1, and the device is mounted for rotation about an axis 32 which extends through the center of the device transversely of the axes of the fibers 22 embodied in the device and parallel to the longer dimension of the device ends. For example, as shown in FIGS. 4 and 5, a hollow cylindrical drum 34 having a pair of coaxial bushing members 36 thereon can be provided with a pair of diametrically opposed, peripheral slots 38 extending parallel to the drum axis, and the image-transfer device 20 can be secured within the drum by any suitable means so that the opposite ends 20.1 and 20.2 of the device extend into respective slots 38 and are aligned substantially flush with the cylindrical drum surface. The drum bushing members 36 are fixedly connected to the shafts 40 and 42 respectively which are supported by bearings 43 or other suitable means so that the drum 34 is adapted for rotation between plates 44 and 46. These plates each preferably have a curved portion, 44.1 and 46.1 respectively, adapted to substantially conform to arcuate portions of the drum surface and are preferably apertured at said curved portions as at 44.2 and 46.2 respectively. It can be seen that, when the drum 34 is rotated in this arrangement, one end 20.1 of the image-transfer device 20 is adapted to traverse the aperture 44.2 in one direction as indicated by the arrow 48 at the same time that the opposite end 20.2 of the device is adapted to traverse the aperture 46.2 in the opposite direction as shown by the arrow 50.

The described apparatus is adapted to encode optical images according to the method of this invention in the following manner. Where a signature card 52 of translucent material having a signature 53 inscribed on one side 52.1 with opaque ink as shown in FIG. 6 represents an image to be encoded, the card can be disposed over the aperture 46.2 in the plate 46, for example with the card surface 52.1 facing outwardly from the aperture as indicated. As will be understood, the card 52 can be proportioned to rest upon the curved portion 46.1 of the plate for conforming the card substantially to the contour of the drum 34, and, if desired, the card can be held in said position by any suitable means (not shown). A light source 54 is adapted to direct a beam of light 54.1, preferably concentrated by a lens system 56, into the aperture 46.2 through the translucent card 52, thereby to project an optical image of the signature 53 upon the surface of the drum 34. When the drum is in a position of rotation as illustrated in FIG. 4 so that a transverse segment of the projected signature image falls upon one end 20.2 of the image-transfer device 20 carried by the drum, the image-transfer device is adapted to transmit light through the device fibers to reproduce said image segment upon the opposite end 20.1 of the device in the manner previously described with reference to FIG. 1. Light-sensitive means such as a photographic film 58 can be positioned over the aperture 44.2 in the plate 44 and can be adapted to record this optical image segment reproduced upon the end 20.1 of the image-transfer device. In this regard, it will be noted that conformity of the plates 44 and 46 to portions of the drum surface 34 is adapted to form a light seal so that light from the beam 54.1 other than light transmitted by the device 20 cannot impinge upon the film 58. For further assuring that light is not reflected from the drum 34 or from the plates 44 or 46 to fog the film 58, the drum and the inwardly-facing surfaces of the plates are preferably painted a dark color.

Figures 7, 8:
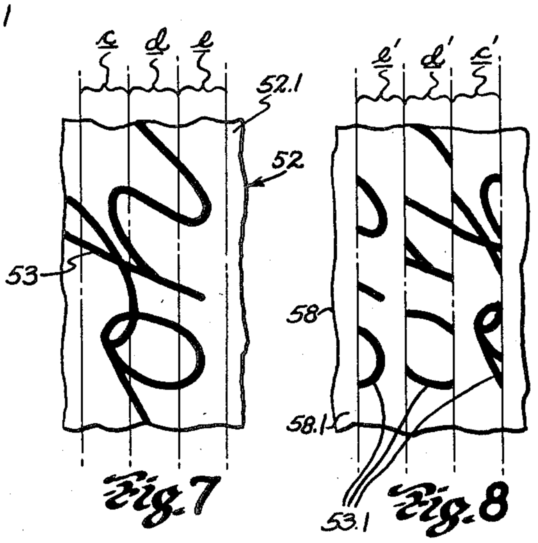
FIG. 7 is an enlarged partial view similar to FIG. 6.
FIG. 8 is an enlarged partial view similar to FIG. 7.
Figure 9:
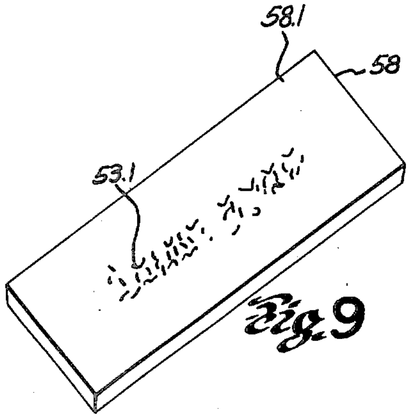
FIG. 9 is a perspective view of a film recording a signature encoded according to this invention.

It will be noted that a segment of the signature image 53 appearing at the right-hand side of the card 52 as shown in FIG. 4 is first recorded upon the left-hand side of the film 58 in the manner described, the segment so reproduced having a width equal to the thickness of the ends of the image-transfer device 20. Thereafter, the drum 34 can be slightly rotated in the direction of the arrow 60 so that the segment of the image 53 next adjacent to the right-hand side of the card 52 can be recorded upon the film 58 in a position next adjacent to the left-hand side of the film. For this purpose, the light source 54 is preferably deenergized or the light beam 54.1 is otherwise cut off from the image-transfer device 20 during rotation of the drum to prevent blurring of the film 58. As will be understood, the drum can be further rotated for recording successive transverse segments of the signature image 53 in sequence and in inverted order upon the film 58. Thus, as shown in the enlarged partial views of the card 52 and film 58 in FIGS. 7 and 8 respectively, segments *c*, *d* and *e* of the signature image 53 will be recorded in inverted order but without inversion of individual segments as image segments *c'*, *d'* and *e'* upon the film 58. It can be seen that, although respective image segments are recorded upon the film 58 without distortion, the inverted order of the pattern of image segments upon the film and the inverted relationship of the recorded image segments to each other is effective to garble or encode the image so that the signature 53 cannot be recognized. In fact, where the image segments transmitted to and received upon the film are of a selected thickness and extend transversely across the length of the signature image as shown, the pattern of image segments recorded upon the film will appear as a scattered arrangement of very short lines 53.1 as indicated in FIG. 9.

It should be noted that in encoding a signature image so that the encoded image cannot be recognized, the transverse segments of the original image which are rearranged for encoding the image should be sufficiently narrow so that no image segment will include a significant or identifiable portion of any letter of the signature. For practical purposes, this consideration requires that the thickness of the image-transfer device 20, which determines the width of the image segments, have a maximum dimension of about 1/16 inch. On the other hand, the respective image segments must have sufficient width so that said image segments appear scrambled and unrecognizable when rearranged in inverted order in the manner described. That is, said image segments cannot be so narrow that portions of the signature 53 reproduced in a segment appear as mere dots because, in such an arrangement, the inverted pattrrn of image segments would cooperate to form a composite image which would comprise merely an overall reversal or inversion of the original image. For this reason, an image-transfer device 20 adapted to encode handwritten signatures of a normal size, preferably has a minimum thickness of about 0.020 inch. Further, in order to encode a signature image and subsequently to decode the signature into recognizable form, the individual fibers 22 embodied in the device 20 should be adapted to transfer image segments while retaining a suitable degree of resolution in the image segments. Thus a fiber 22 having a core diameter or maximum transverse dimension of less than 0.008 would be preferred for apparatus adapted to encode handwritten signatures or most other discrete-line images whereas fibers with cores smaller than 0.003 in transverse dimension would be preferred for encoding toned or shaded images.

Figure 10:
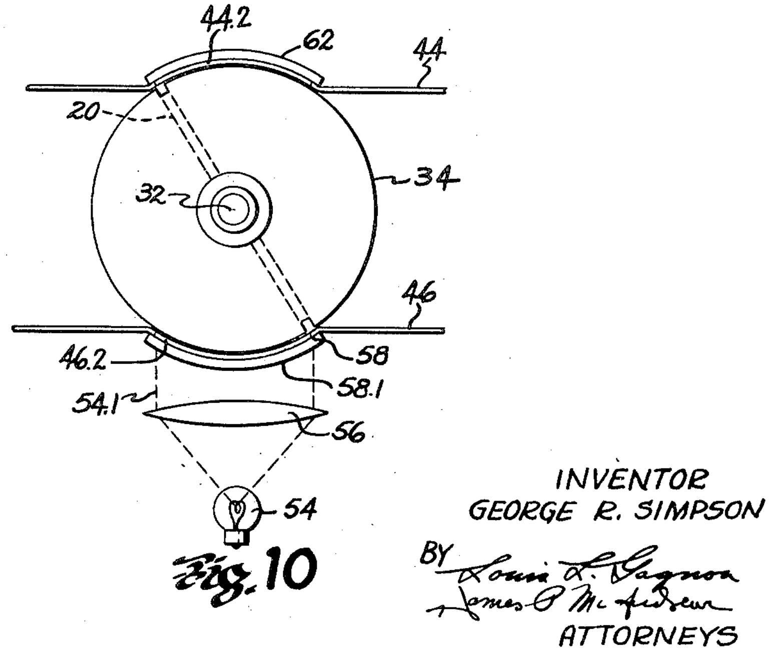
FIG. 10 is a side elevation view similar to FIG. 4 illustrating use of the apparatus for decoding an image.

The apparatus illustrated in FIGS. 4 and 5 can also be utilized for decoding a scrambled or encoded image such as that recorded upon the film 58. Thus, as shown in FIG. 10, where the film 58 comprises a photographic transparency, the film can be positioned over the aperture 46.2 of the plate 46 with the surface 58.1 of the film facing outwardly from the aperture. Another light-sensitive film 62 can be positioned over the aperture 44.2 in the plate 44, and the drum 34 can be intermittently illuminated and rotated in the manner previously described for recording segments of the image recorded upon the film 58 in reinverted or reoriented relation upon the film 62, thereby to record the original signature 53 in decoded, recognizable form on the film 62 as will be understood.

Figure 11:
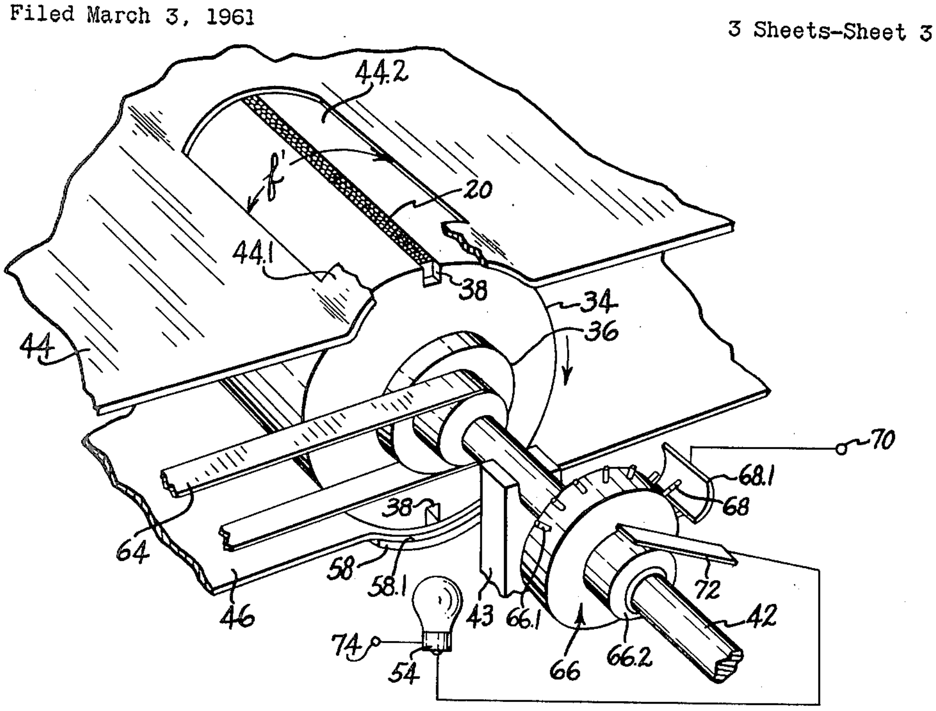
FIG. 11 is a partial perspective view illustrating drive and control means for the apparatus of FIG. 4.

In a more advantageous arrangement, the apparatus illustrated in FIG. 4 can be adapted in the manner shown in FIG. 11 for decoding a scrambled image recorded upon the film 58 without requiring recording of the decoded image on a film such as the film 62. In this embodiment of the invention, the film 58 carrying an encoded signature image is disposed over the aperture 46.2 of the plate 46 in a manner similar to that described with reference to FIG. 10 but the surface 58.1 of the film is arranged to face inwardly of the aperture. A drive belt 64 or other suitable means is then provided for continuously rotating the drum 34 so that, as one end of the image-transfer device 20 traverses the scrambled image appearing on the film 58 in a continuous sweep or scan, the opposite end of the image-transfer device is adapted to reproduce a sequence or continuous sweep of segments from tht film image in reoriented or decoded relation to be viewed through the aperture 44.2 in the plate 44. However, in order to permit the image segments reproduced in the aperture 44.2 to be viewed as a composite, decoded image which can be recognized by a person viewing the image without requiring recording of the image, all of said image segments must be viewed substantially simultaneously. Thus according to this invention, the drum 34 must be rotated at a rate of speed such that the image-transfer device 20 can scan the entire image on the film 58 in less than 1/8 of a second, thereby to reproduce all segments of the image in decoded relation in the aperture 44.2 within said very short period of time. In this manner, although respective image segments viewed in the aperture 44.2 are actually reproduced in sequence and are each in view for only an instant, all of said segments will appear to be in view substantially simultaneously as a result of the natural visual retention of the human eye. In this regard, it will be noted that a signature card 52 would normally require a height *f* (see FIG. 6) of at least 3/4 inch in order to accommodate a reasonably-sized signature thereon. Therefore, the plate apertures 44.2 and 46.2 would also require a width *f′* of 3/4 inch to permit projection of the signature image 53 therethrough. Where the drum 34 is of approximately 2 inches diameter, the drum must be rotated at a rate of about 60 r.p.m. so that the image-transmer device 20 can scan a 3/4 inch wide aperture 44.2 or 46.2 in 1/8 second.

It will be recognized that, where the drum 34 is rotated at constant speed in the manner above described, the composite image viewed through the aperture 44.2 will have segments thereof arranged in properly oriented or decoded relation but the image segments will be blurred to such an extent that the composite image cannot be recognized. That is, as different parts of one end of the image-transfer device 20 traverse a point of the encoded image on the film 58, that point will be reproduced in the aperture 44.2 a plurality of times as various fibers 22 traverse the point and will appear as a line of a length equal to twice the thickness of the image-transfer device. According to this invention, a bushing 66 having electrical contacts 66.1 circumferentially spaced thereon is secured to the shaft 42 to be rotated in conjunction with the drum 34 and a stationary electrical contact 68 is mounted upon any suitable support 68.1 adjacent the bushing so that the stationary contact is adapted to electrically engage the rotating contacts 66.1 in intermittent sequence as the drum and bushing are rotated. The stationary contact 68 is directly connected to one pole of an electrical power source as indicated by the terminal 70 and a brush 72 of any conventional type is adapted for sliding electrical engagement with a flange 66.2 of the rotating contact bushing, the brush being connected in series relation with the light source 54 and with the opposite pole 74 of the power source. As the drum 34 is rotated so that ends of the image-transfer device 20 traverse the encoded image on the film 58 in a continuous sweep, the device will become fully aligned with successive discrete segments *c′*, *d′*, and *e′* of the original image embodied in the encoded and recorded film image at spaced intervals of time as will be understood by reference to FIG. 8. The contacts 66.1 can be spaced in the bushing 66 to intermittently open and close a circuit through the light source 54 in synchronous relation to said alignment of the device 20 so that light is directed through the film 58 for only a very short period of time during each brief instant that the image-transfer device is aligned with said successive discrete segments of the image on the film. In this manner, each successive discrete segment of the original image recorded on the film 58 will be exposed to light and will be reproduced to be viewed in the aperture 44.2, but, since each of said image segments is exposed to light and reproduced for only an instant, the overall decoded image produced in the aperture 44.2 will not be excessively blurred and can be easily recognized.

In this regard, it will be noted that, where the width of the aperture 46.2 to be scanned is 3/4 inch and where the thickness of the image-transfer device 20 is 0.050 so that the image-transfer device 20 is adapted to divide the signature image projected through the aperture 46.2 into 15 discrete image segments, each segment on the encoded signature image recorded on the film 58 must be traversed or scanned within 8.33 milliseconds so that said image segments can be viewed within the aperture 44.2 within the prescribed time. In order to reduce blur in the reproduced image segments to about 5% of the blur above described so that said reproduced image segments can be recognized as forming a composite decoded image, each image segment traversed must be exposed to light for about 5% of the time required for traversing a point on said image segment. Thus, in this example, the image segments must each be exposed to light for about 0.416 millisecond or 416 microseconds maximum. In this regard, it will be noted that a stroboscopic light source will generally be preferred for the light source 54 in the embodiment of this invention illustrated in FIG. 11 in order to provide light of adequate brightness, frequency length and pulse rate as will be understood. For example, the source 54 can comprise a stroboscopic light such as that which is commercially available at the present time from the General Radio Corporation of West Concord, Massachusetts, under the designation Strobotac type 1531–A and which has a pulse length of from 1 to 6 microseconds and can be pulsed at a frequency of 400 pulses per second.

It should be understood that although a particular embodiment of this invention has been illustrated in FIG. 11 for viewing a decoded optical image without requiring recording of the decoded image on film or the like, any other comparable apparatus for achieving this purpose would also be within the scope of this invention. For example, the illustrated continuous drive means 64 could be replaced by an intermittent drive means such as a conventional Geneva mechanism, and the mechanically tripped stroboscopic light source 54 could be replaced by a continuous light source having conventional shuttering means for effecting intermittent exposure of the film 58 as will be understood.

Figure 12:
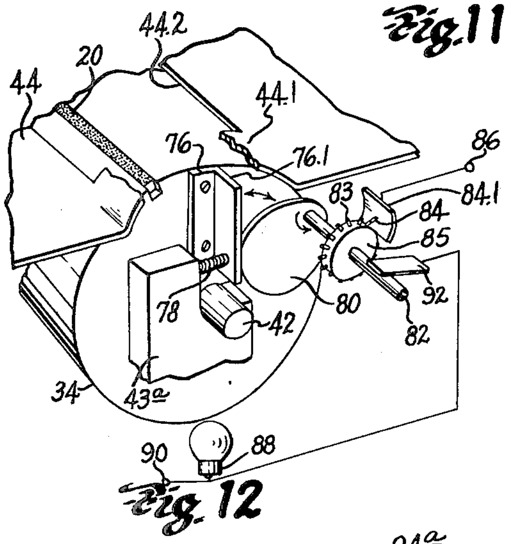
FIG. 12 is a partial perspective view illustrating alternative drive and control means for the apparatus of FIG. 4.

The apparatus described with reference to FIGS. 4 and 5 can also be adapted to permit viewing of a decoded optical image in the manner illustrated in FIG. 12, this apparatus being adapted to repeatedly reproduce segments of an image in decoded relation so that the composite decoded image formed by said segments can be viewed continuously for an extended period of time. In this embodiment of the invention, the drum 34 carrying an image-transfer device 20 and having shaft members 40 and 42 as described with reference to FIGS. 4 and 5 can be mounted for free rotation between apertured plates 44 and 46 in conventional bearing supports 43*a* as shown in FIG. 12. A cam follower 76 such as the illustrated length of angle iron can be secured to one side of the drum 34 and can be provided with a smooth cam surface 76.1 thereon. A spring member 78 is then arranged, preferably between the cam follower and a bearing support 43*a*, for biasing the cam follower in one direction so that said bias on the follower tends to rotate the drum 34 in one direction. A cam member 80 is then mounted for eccentric rotation by a driven shaft 82, the cam member being adapted to ride against the surface 76.1 of the cam follower for moving the cam follower and for rotating the drum 34 in a direction opposite to the bias of the spring member 78. As will be understood, the cam can be proportioned relative to apertures 44.2 and 46.2 in the plates 44 and 46 so that the cam will first rotate the drum in one direction to permit the ends of the image-transfer device 20 to sweep or scan the plate apertures 44.2 and 46.2 in a manner similar to that described with reference to FIG. 11. Thereafter, the cam can permit the spring member 78 to rotate the drum in the opposite direction so that the image-transfer device can sweep or scan said apertures in reverse directions. The cam member 80 is thus adapted to oscillate the drum 34 so that the ends of the image-transfer device 20 continuously sweep the plate apertures.

The apparatus includes electrical contact members 83 which are spaced along the peripheral surface of a contact bushing 85, the contact bushing being fixedly mounted on the shaft 82 for rotation with the cam member 80. As the cam and bushing are rotated, the contact members 83 are adapted to electrically engage a single stationary contact member 84 in intermittent sequence. The contact 84 mounted on a suitable support 84.1 can be connected to one pole of an electrical power source as at 86, and the bushing contacts 83 can each be connected in series relation with a light source 88 and with the opposite pole 90 of said power source by means of a conventional brush member 92 which is arranged in sliding electrical contact with the shaft 82. In this manner, the light source 88 can be intermittently energized for directing light through the plate aperture 46.2 as the rotating contacts 83 engage the stationary contact 84.

When a film 58 having segments of a signature image recorded thereon in inverted or encoded relation is positioned over the aperture 46.2, the cam 80 can be rotated for oscillating the drum 34 so that one end of the image-transfer device 20 is aligned with successive discrete segments of the recorded image at spaced intervals of time. The contacts 83 can be spaced along the periphery of the bushing 85 so that the light 88 is energized for a brief instant in synchronous relation to said alignment whereby each successive segment of the recoded image will be reproduced to be viewed in the aperture 44.2 in reoriented relation in the manner described with reference to FIG. 11. In this regard, it will be noted that where the image-transfer device is adapted to scan the film 58 within ⅛ second, all segments of the recorded image reproduced in reoriented relation in the aperture 44.2 will appear to be in view substantially simultaneously as a result of the natural visual retention of the eye. However, where the drum 34 is oscillated as described, an image segment reproduced adjacent one side of the aperture will not be reproduced a second time until drum oscillation has caused the image-transfer device 20 to scan the aperture 44.2 and the film 58 once in each direction. Thus in the embodiment of this invention illustrated in FIG. 12, the cam member 80 is preferably adapted to oscillate the drum 34 at such a rate that the image-transfer device 20 is adapted to scan the aperture 44.2 and the film 58 once in each direction within a period of ⅛ second, whereby image segments reproduced in the aperture 44.2 will be repeatedly reproduced at such a rapid rate that the decoded image formed by said segments will appear to be in view continuously as a result of visual retention of the eye.

Where the cam member has a continuously sloping surface as illustrated so that the image-transfer device is adapted to scan the apertures in the plates 44 and 46 in a sweeping motion, the light source 88 preferably comprises a stroboscopic light source as described with reference to FIG. 11 so that the film 58 will be exposed to light for just an instant when the image-transfer device is aligned with each successive discrete segment of the film image, thereby to reduce blurring of the reproduced decoded image in the manner previously described. However, it will be understood that the cam member 80 could be provided with spaced, non-sloping portions so that the cam would be adapted to move the drum with progressive, intermittent steps for scanning the apertures in the plates 44 and 46. In such an arrangement, a light source adapted for pulsing at much slower rates could be utilized and any conventional light source could be substituted for the stroboscopic light source 88. In addition, it should be understood that any other conventional means for oscillating the drum 34 in a continuous or intermittently sweeping motion could be used within the scope of this invention.

Figure 13:
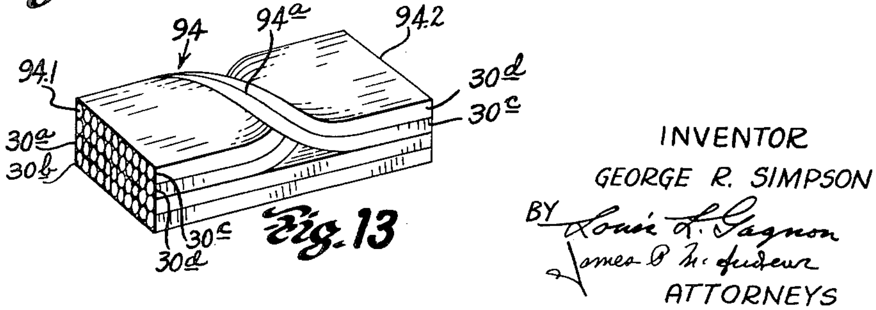
FIG. 13 is a perspective view similar to FIG. 1 showing an alternative fiber-optical image-transfer device.

Although the image-transfer device 20 as incorporated in the various described embodiments of the apparatus of this invention has comprised a device in which fibers 22 have been arranged in identical geometrical patterns at opposite ends 20.1 and 20.2 of the device, any similar fiber-optical image-transfer device could be employed within the scope of this invention. For example, as shown in FIG. 13, an image-transfer device 94 could embody fiber ribbons 30 in an arrangement wherein two ribbons 30*a* and 30*b* extend between device ends 94.1 and 94.2 in side-by-side parallel relation and wherein two other fiber ribbons 30*c* and 30*d* are twisted as at 94*a* intermediate the device ends. As will be understood, such an image-transfer device 94 is adapted to transmit a part of an image or image segment from the end 94.1 to end 94.2 thereof through the ribbons 30*a* and 30*b* to reproduce said part of the image segment in one position on the end 94.2 and is adapted to transmit another portion of the image or image segment through the fiber ribbons 30c and 30d to reproduce said portion in an inverted and reversed position upon the device end 94.2. Thus encoding and decoding apparatus as above described which incorporates an image-transfer device such as the device 94 will be adapted to provide more thoroughly encoded images upon a film such as the film 58 as will be understood. It should be noted that the selected image-transfer device should not be too complex in design in order to assure that many such devices of identical characteristics can be easily manufactured, whereby an image encoded by an apparatus incorporating one such image-transfer device can be accurately decoded by apparatus incorporating others of said devices.

Figure 14:
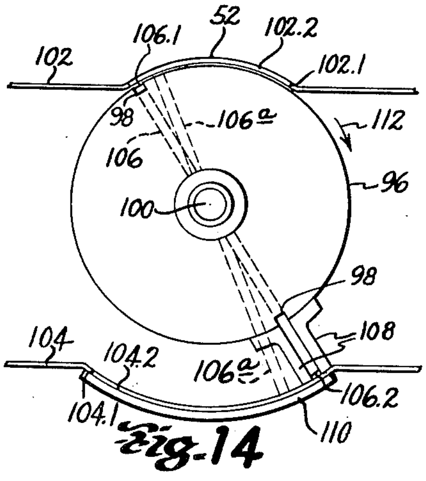
FIG. 14 is an end elevation view similar to FIG. 4 illustrating an alternative embodiment of the apparatus of this invention.

Another embodiment of the apparatus of this invention which is also adapted to provide more thoroughly encoded images upon a film such as the film 58 is illustrated in FIG. 14. In this embodiment of the invention, a cylindrical drum 96 having diametrically opposed peripheral slots 98 parallel to the drum axis is mounted for rotation on an axis 100 between plates 102 and 104, and a fiber-optical image-transfer device 106 is secured within the drum with one end 106.1 of the device disposed within a slot 98 substantially flush with the peripheral drum surface and with the opposite end 106.2 of the device extending through another drum slot 98 for a substantial distance outwardly from the drum surface. The device 106 is generally similar to the image-transfer device 20 previously described. Brackets 108 can be secured to the drum surface in any suitable manner for supporting the extending end of the image-transfer device 106. As illustrated, one of the plates 102 preferably has a curved portion 102.1 adapted to conform to an arcuate portion of the surface of the drum 96 and is apertured as at 102.2 within said curved portion. The other plate 104 also has a curved portion 104.1 which, however, is adapted to conform to the path of the end 106.2 of the image-transfer device as the drum 96 is rotated. The curved portion of the plate 104 is also apertured as at 104.2. In this arrangement, a signature card such as the card 52 previously described can be positioned over the plate aperture 102.2 and light (from any suitable source not shown) can be directed through the card for projecting an image upon the drum 96. As in the embodiment of this invention described with reference to FIGS. 4 and 5, the image-transfer device 20 carried by the drum is adapted to receive light from a segment of said image for reproducing said image segment in the aperture 104.2 in the plate 104 where said image segment can be recorded upon a light-sensitive film 110 disposed over the aperture 104.2. The drum 96 can then be rotated in the direction of the arrow 112 so that a second segment of the image projected from the card 52 is received within the end 106.1 of the image-transfer device 106 as indicated in FIG. 14 by the dotted lines 106a. However, since the image-transfer device extends outside the periphery of the drum 96 at its opposite end 106.2 so that opposite ends of the device 106 have pivot arms of different length, said second image segments will be recorded upon the film 110 in a spaced relation to the image segment previously recorded thereon which is greater than the spacing of said image segments on the card 52. As will be understood, this recording process can be carried out in the manner described with reference to FIGS. 4 and 5 to provide a film 110 having successive transverse segments of an original image recorded thereon in inverted succession and in spaced and inverted relation to each other to form an encoded image. The film 110 can then be further exposed to light in any conventional manner so that superfluous or misleading image data are recorded on the film between said segments of the original image, thereby to further encode or garble the recorded image. The apparatus described in FIG. 14 can also be used in the manner described with reference to FIGS. 10 or 12 for decoding an encoded image recorded on the film 110 but, as will be understood, since the device 106 cannot be rotated for a complete revolution between the plates 102 and 104, the apparatus cannot be employed for decoding an image in the manner described with reference to FIG. 11.

In embodiments of the apparatus of this invention described above, the signature card 52 has been located in a single position during encoding of an image from the card and the various films carrying encoded images have also been held motionless during decoding of images recorded on the films. However, said cards and films could also be oscillated or moved along predetermined paths by any suitable means during said image encoding and decoding within the scope of this invention where more thoroughly encoded images are required. This invention includes all modifications and equivalents of the described methods and apparatus which fall within the scope of the appended claims.

Having described my invention, I claim:

1. Apparatus for decoding encoded material where the encoded material consists of transverse segments of an original image arranged in inverted succession and in inverted relation to each other, said apparatus comprising means supporting said encoded material with said succession of encoded image segments disposed along a first arc, a fiber optical image-transfer device adapted to be aligned at one end with an encoded image segment for receiving light therefrom and for displaying said image segment to view upon the opposite end of said device, means mounting said image-transfer device for movement about a selected axis located intermediate said device ends to dispose said one device end in a position of alignment with each encoded image segment in sequence along said first arc and to dispose said opposite device end in a series of corresponding positions along a second arc to display said image segments to view in reoriented relation to each other, means moving said image-transfer device about said axis for moving said device ends through said sequences of positions along respective arcs within approximately one-eighth second, and means intermittently illuminating each encoded image segment as said one device end is aligned therewith for displaying said image segments clearly to view in reoriented relation to each other within said one-eighth second, whereby said image segments appear to be viewed substantially simultaneously as a result of the natural visual retention of the human eye for permitting recognition of said original image in decoded form.

2. Apparatus for decoding encoded material where the encoded material consists of transverse segments of an original image arranged in inverted succession and in inverted relation to each other, said apparatus comprising means supporting said encoded material with said succession of encoded image segments disposed along a first arc, a fiber optical image-transfer device adapted to be aligned at one end with an encoded image segment for receiving light therefrom and for displaying said image segment to view upon the opposite end of said device, means mounting said image-transfer device for movement about a selected axis located intermediate said device ends to dispose said one device end in a position of alignment with each encoded image segment in sequence along said first arc and to dispose said opposite device end in a series of corresponding positions along a second arc to display said image segments to view in reoriented relation to each other, means oscillating said image-transfer device about said axis for repeatedly moving said device ends through said sequences of positions along respective arcs at a rate of approximately one-sixteenth second per oscillation, and means intermittently illuminating each encoded image segment as said one device end is aligned therewith for displaying each of said image segments clearly to view in reoriented relation to the other image segments at least once within approximately each one-eighth second, whereby said image segments appear to be viewed continuously as a result of the natural visual retention of the human eye for permitting recognition of said original image in decoded form.

3. Apparatus for decoding encoded material where the encoded material consists of transverse segments of an original image arranged in inverted succession and in inverted relation to each other, said apparatus comprising means supporting said encoded material with said succession of encoded image segments disposed along a first arc, a fiber optical image-transfer device embodying a plurality of light-conducting optical fibers which are secured together in side-by-side relation in identical geometrical patterns at opposite ends of said device, said device being adapted to be aligned at one end with an encoded image segment for receiving and conducting light from said image segment through said device fibers for displaying said image segment to view upon the opposite end of said device, means mounting said image-transfer device for movement about a selected axis located intermediate said device ends to dispose said one device end in a position of alignment with each encoded image segment in sequence along said first arc and to dispose said opposite device end in a series of corresponding positions along a second arc to display said image segments to view in reoriented relation to each other, means moving said image-transfer device about said axis for moving said device ends through said sequences of positions along respective arcs within approximately one-eighth second, and means intermittently illuminating each encoded image segment as said one device end is aligned therewith for displaying said image segments clearly to view in reoriented relation to each other within said one-eighth second, whereby said image segments appear to be viewed substantially simultaneously as a result of the natural visual retention of the human eye for permitting recognition of said original image in decoded form.

4. Apparatus for decoding encoded material where the encoded material consists of transverse segments of an original image arranged in inverted succession and in spaced and inverted relation to each other, said apparatus comprising means supporting said encoded material with said encoded image segments disposed in said inverted succession and in said spaced and inverted relation to each other along a first arc, a fiber optical image-transfer device adapted to be aligned at one end with an encoded image segment for receiving light therefrom and for displaying said image segment to view upon the opposite end of said device, means mounting said image-transfer device for movement about a selected axis located intermediate said device ends to dispose said one device end in a position of alignment with each encoded image segment in sequence along said first arc and to dispose said opposite device end in a series of side-by-side corresponding positions along a second arc to display said image segments to view in side-by-side reoriented relation to each other, means oscillating said image-transfer device about said axis for repeatedly moving said device ends through said sequences of positions along respective arcs at a rate of approximately one-sixteenth second per oscillation, and means intermittently illuminating each encoded image segment as said one device end is aligned therewith for displaying each of said image segments clearly to view in side-by-side reoriented relation to the other image segments at least once within approximately each one-eigthh second, whereby said image segments appear to be viewed continuously as a result of the natural visual retention of the human eye for permitting recognition of said original image in decoded form.

References Cited in the file of this patent

UNITED STATES PATENTS

| | | |
|---|---|---|
| 2,417,163 | Horst | Mar. 11, 1947 |
| 2,437,255 | Hogan et al. | Mar. 9, 1948 |
| 2,526,694 | Samet | Oct. 24, 1950 |
| 2,952,080 | Avakian et al. | Sept. 13, 1960 |